May 31, 1932.   H. W. BELL   1,860,831
SPRING SUSPENSION
Filed July 20, 1929   2 Sheets-Sheet 1
Fig. 1.
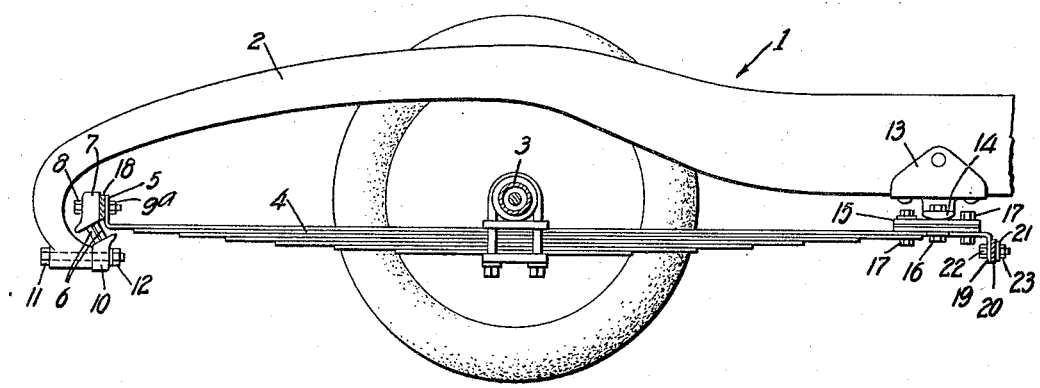
Fig. 2.
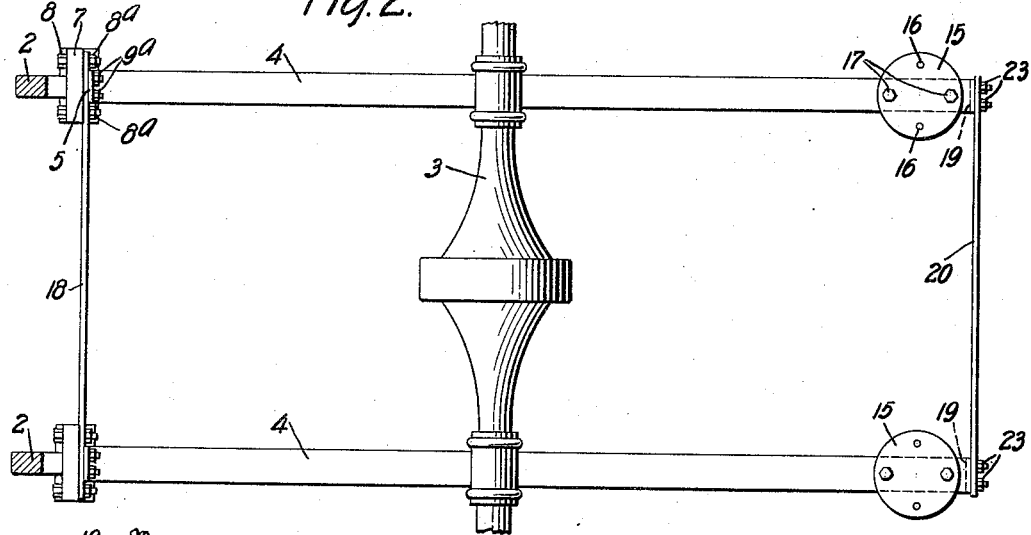
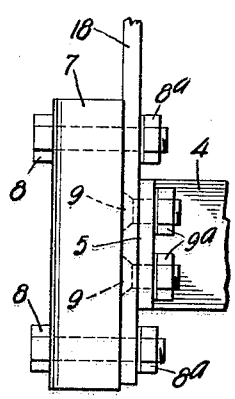
Fig. 3.
INVENTOR
Harvey W. Bell.
BY
ATTORNEYS

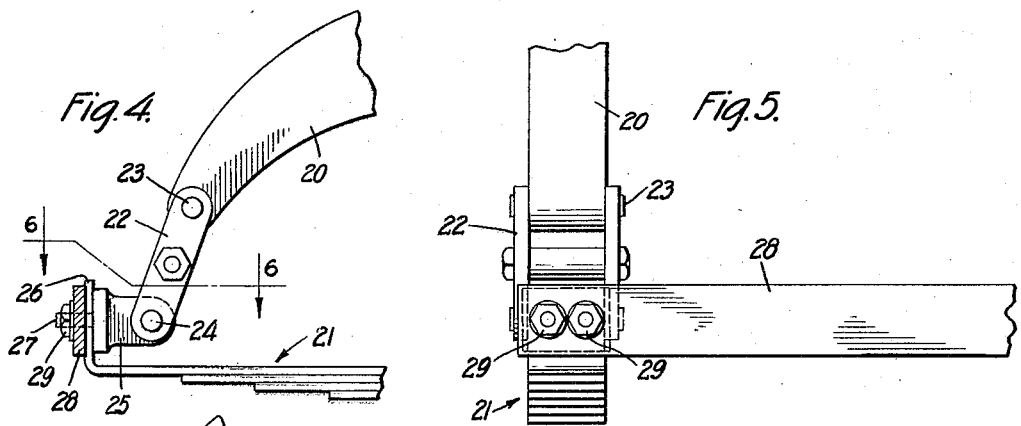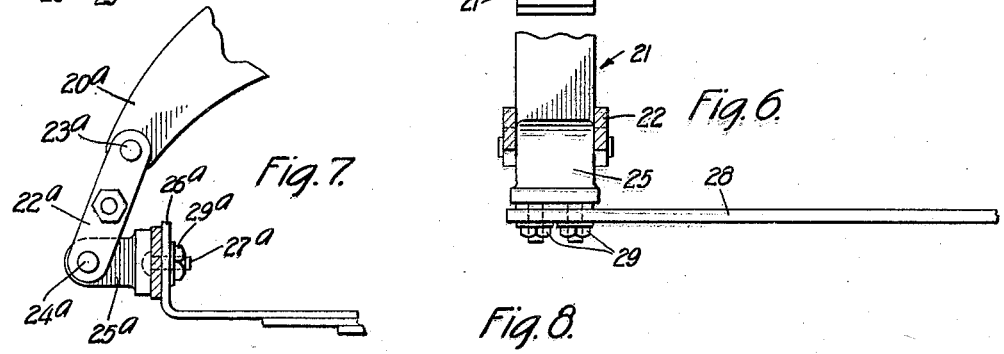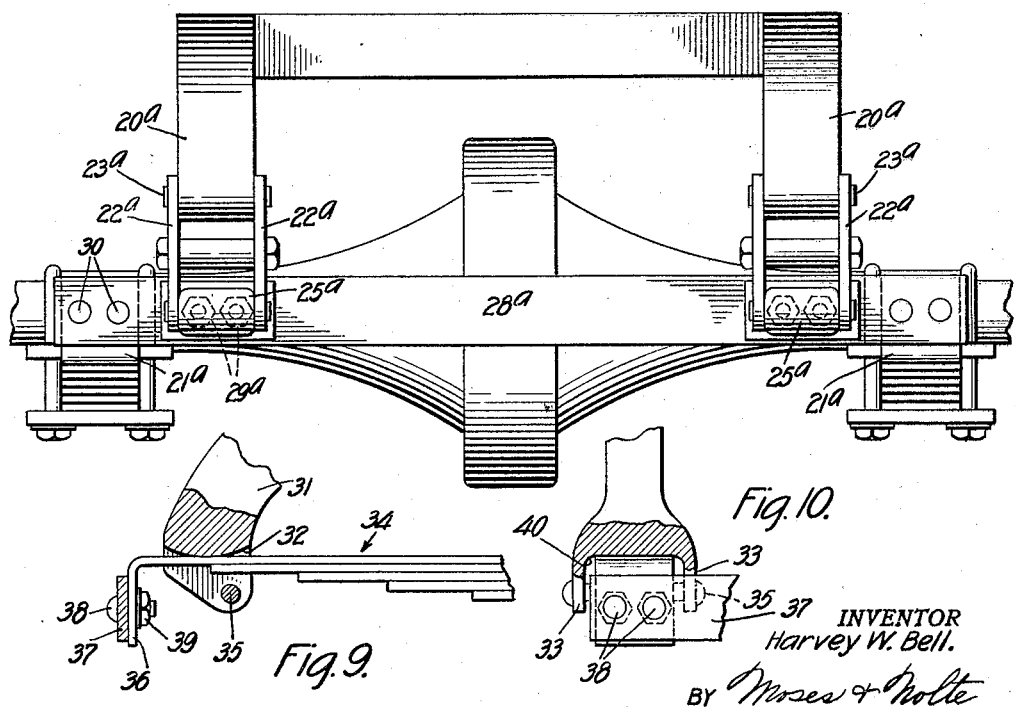

Patented May 31, 1932

1,860,831

UNITED STATES PATENT OFFICE

HARVEY W. BELL, OF ARDSLEY-ON-HUDSON, NEW YORK, ASSIGNOR TO THE BELOYT CORPORATION, OF NEW YORK, N. Y., A CORPORATION OF DELAWARE

SPRING SUSPENSION

Application filed July 20, 1929. Serial No. 379,616.

This invention relates to motor vehicles and more particularly to the spring suspensions thereof. It is particularly applicable to spring suspensions in which non-metallic shackles are employed, as for example, of the type disclosed in the patents to Bell Nos. 1,660,029 and 1,660,031, and is illustrated herein in connection with shackles of this type. It should be particularly observed, however, that the invention is also useful in connection with other types of shackles as will appear more particularly hereinafter.

An important function of a shackle is to assist in the prevention of excessive lateral rocking or rolling of the body. A well made tight-fitting metal shackle is capable of exercising this function because it holds the spring ends rigidly parallel to the body so that any rocking of the body with reference to the axle brings about a twisting of the springs, which twisting, of course, serves to resist and limit the rocking motion of the body.

In causing this twisting of the springs, the shackles are subjected to a severe strain which soon results in wear and consequent looseness of the shackles. This has the result of rendering the shackles less effective in resisting the rolling in that they permit a certain amount of free movement of the body before the springs are subjected to the twisting force.

A somewhat similar situation obtains in shackles of the non-metallic type for the reason that the non-metallic element which intervenes between the spring and the body is usually of such inherently yielding nature that a limited degree of rocking or swaying of the body may take place without subjecting the spring ends to twisting.

One of the objects of the present invention is to provide a construction whereby the shackles are relieved of the function of subjecting the spring ends to the twisting force during rocking or rolling movements of the body and to provide for this purpose a spring steel leaf or bar which is rigidly connected to corresponding ends of the springs at opposite sides of the body, the construction and arrangement of this bar being such that it flexes readily in the longitudinal direction of the springs but is substantially non-flexible at right angles to the plane of the springs. Because of this arrangement if the spring on one side of the body is deflected more than the corresponding spring on the other side, the bar which connects the corresponding ends of the springs being inflexible in the plane of the springs, will cause the ends of the springs to twist and thus resist further deflection.

A further feature of the cross leaf of the present invention is that it serves to relieve the shackles of still another function, namely, that of keeping the spring ends always equi-distant. When the body moves out of parallelism with the axle due to any condition, such as rolling or swaying, the distance between any two corresponding spring ends on opposite sides of the vehicle tends to increase, the reason for this result being that the ends of the springs tend to move in paths at right angles to the axle to which they are bolted. Consequently, if the one spring end is lower than the other the diagonal dimension from the one spring end to the other is greater than the normal distance between them. Owing to the fact that, however, the shackles are mounted on the body at fixed distances apart they force the springs to bend in their own planes to hold them at their fixed distances from each other with the result that a further powerful force is set up to check the rocking or swaying of the body.

With the cross bar construction of the present invention the shackles are entirely relieved of this force, the function and strain of keeping the spring ends at their normal distance being taken by the cross bar, which, being rigidly bolted to corresponding ends of the springs, forces these ends to remain equi-distant at all times.

The cross bar or leaf of the present invention, therefore, in assuring certain functions heretofore performed by the shackles, relieves them of the corresponding strain. Their wear, therefore, is considerably reduced and their initial constructions may be made much smaller and cheaper than heretofore practicable. The invention, therefore, is of particular importance in relation to shackles of the non-metallic type in that it renders it practicable to materially reduce their cost of construction.

The transverse bar or leaf is desirably thin in its fore and aft dimension for reasons of flexibility. Any unequal loading of the springs to which the cross-bar is attached tends to put the bar under tension and also to flex and twist it. Such flexibility is desirable for the reason that the springs are enabled to elongate and to flex independently of one another without being subjected by the cross bar to excessive strain and without detrimental interference with one another.

It has been found that the freedom from the edge loading which may be secured by practicing the invention enables the cost of the flexible fabric material to be materially reduced, since, with the "edge loading" substantially eliminated, the quantity of flexible fabric required to be employed to resist all of the other strains to which the shackle is subjected in use is very much less than where sufficient material must be provided to afford adequate strength for resisting "edge loading".

The invention has also been found to produce very advantageous results when used in conjunction with the fabric shackles of the compression type as illustrated in said Patent No. 1,660,031.

It also has utility in connection with shackles of other types such as the ordinary metallic link shackles, since the tendency toward relative tilting of the body and spring produces the principal friction and wear at the pivots of the shackles and upon the lateral bearing surfaces of the relatively movable shackle members.

Other objects and advantages will hereinafter appear.

In the drawings forming part of this specification:

Figure 1 is a fragmentary, side elevation, partly in section, of a motor vehicle embodying the invention;

Figure 2 is a sectional plan view of the mechanism illustrated in Figure 1;

Figure 3 is a detail view of one end of the vehicle spring and associated parts;

Figure 4 is a fragmentary sectional side elevation showing the invention applied to a vehicle employing metal to metal shackles;

Figure 5 is a rear elevation of the parts disclosed in Figure 4;

Figure 6 is a sectional view taken on the line 6—6 of Figure 4;

Figure 7 is a fragmentary sectional elevation of a vehicle embodying features of the present invention in a modified form;

Figure 8 is a fragmentary rear elevation of a vehicle embodying the improvements of Figure 7;

Figure 9 is a fragmentary sectional side elevation of a further modification; and Figure 10 is a rear elevation partly broken away of the mechanism shown in Figure 9.

The invention is shown as applied to a vehicle 1, comprising body frame members 2, supported from an axle 3 by resilient leaf springs 4. The axle 3 is shown as the rear axle of the vehicle although it will be understood, of course, that the construction may be, and preferably is, duplicated at the forward end of the vehicle.

Each spring 4 is provided at the rear end thereof with an upturned ear 5, to which a spring leaf 18 (to be more fully described hereinafter) is clamped by bolts 9 and nuts 9a. One or more flexible fabric links 6 are clamped by means of a boxing 7, bolts 8 and nuts 8a to the bar 18. The links 6 extend downward and are clamped at their lower ends between the face of the body member 2 and a boxing 10 by bolts 11 and nuts 12.

At the forward end of the spring provision is made of a bracket 13 secured to the body member 2 and provided at its lower ends with transversely extending arms 14 which are bolted to marginal portions of horizontally disposed fabric discs 15 by bolts 16. The spring extends beneath these fabric discs and is bolted to marginal portions of the discs by bolts 17 at points quadrangularly related to the points at which the bolts 16 pass through the discs. As thus far described, the spring and shackle structure is generally similar to that of the Patent No. 1,660,029 referred to above, with the exception that in the patented structure the cross leaf 18 is not provided.

This leaf 18 is preferably of spring steel or other resilient material; it extends across the vehicle and is rigidly secured to the springs at opposite sides of the vehicle, between the boxings 7 and the ears 5, by the bolts 9 and the nuts 9a. A like bar 20 is shown similarly connected across the front ends of the springs, which for this purpose are provided with downturned ears 19 to which the ends of bar 20 are clamped by means of bolts 22, washers 21 and nuts 23. The cross bar, being inflexible in a vertical direction, moves in parallelism with the body whenever the body is rocked or is moved vertically. If one spring is stressed differently from the other, therefore, the cross bar 18 compels the ends of the springs to twist about longitudinal axes to the same inclination as the cross bar, and hence to the same inclination as the body.

Although the cross bar 18 is thin and therefore flexible in the fore and aft direction it has no tendency to buckle for the reason that the spring ends are nearest together when the springs are in parallel relation to one another and that any movement out of parallelism tends to increase the separation between the spring ends to which the cross bar is connected and therefore places the cross bar under tension.

In case the springs of the vehicle are not in parallelism to each other, the cross bar should be of a length equal to the separation of the spring ends when the same are without camber.

In Figures 4, 5 and 6 disclosure is made of fragments of a vehicle comprising a body member 20 and a spring 21 connected by metallic shackle links 22 of ordinary construction. Each link 22 is connected directly to the frame member 20 by means of a pivot pin 23 but is connected by means of a pivot pin 24 at its lower end to a bracket 25 which is rigidly secured to an upturned ear 26 at the end of the master leaf of spring 21. The bracket 25 is provided with a pair of threaded studs 27 which pass through the ear 26 and through one end of a cross bar 28. Nuts 29 threaded on the studs 27 hold the bracket 25, the ear 26 and the cross bar 28 securely in assembled relation. The cross bar 28 extends across the vehicle from spring to spring, being connected to corresponding ends of springs at opposite sides of the vehicle in the manner just described. Only one side of the vehicle is shown in the drawings for the reason that the connections at opposite sides of the vehicle are alike and that the complete assembly will be readily appreciated from a comparison of the disclosure of Figures 4, 5 and 6 with that of Figures 1 to 3. The cross bar of Figures 4 to 6 compels the spring ends to remain equi-distant and in substantial parallelism with the body in a lateral direction, and hence greatly reduces excessive friction and wear of the various parts of the shackles.

The embodiment of Figures 7 and 8 is similar in most respects to that of Figures 4 to 6. In Figures 7 to 8 disclosure is made of the application of the present invention to a vehicle in which the springs at opposite sides of the vehicle are more widely separated from one another than are the corresponding side frame members of the body. Each side frame member 20a is connected through a pivot pin 23a to a shackle link 22a which link is connected through a pin 24a to a bracket 25a. The bracket 25a is connected to a cross bar 28a by means of studs 27a and nuts 29a. The cross bar extends outward beyond the points of connection to the brackets 25a and is secured at each end by means of rivets 30 or other suitable means to upturned ears 26a at the end of each spring 21a.

In Figures 9 and 10 disclosure is made of still another type of spring and body connection in which the cross bar of the present invention may be advantageously associated with the springs. The body member 31 is provided with a face 32 at the lower end thereof which is downwardly convex in a longitudinal direction. Ears 33 are provided at opposite sides of this curved surface and extend downward to embrace one end of a spring 34. A pin 35 extends between these ears and is permanently secured to them beneath the spring 34 to limit separation of the body member 31 and the spring. The spring 34 is provided at the end thereof with a downturned ear 36 to which a cross bar 37 is secured by means of bolts 38 and nuts 39. This cross bar is connected at opposite ends of springs 34 at opposite sides of the vehicle as in the forms of the invention previously described. It is obvious that flexure of the spring in this kind of construction involves relative rubbing in a longitudinal direction between the surface 32 and the spring 34. The frictional wear produced by such rubbing is well distributed and therefore substantially reduced by the provision of the cross bar 37 which tends to maintain the end of the spring in even engagement throughout its width with the surface 32.

It will be noted that the spring 34 is somewhat narrower than the sides between the ears 33 so that considerable play is allowed for sidewise bodily movement of the spring 34 relative to the body member 31. In order to prevent objectionably violent engagement of the spring with the inner vertical surface of the ears 33, the surface 32 is caused to merge smoothly with the ears 33 by rounding the corners as seen at 40.

While I have described only a few forms of embodiments of my invention, I do not wish to be limited to the embodiments shown, but what I desire to cover by Letters Patent is set forth in the appended claims.

I claim:

1. In a motor vehicle, the combination with the body and a pair of substantially parallel leaf springs, of means flexibly connecting the spring ends to the vehicle body, and a crossbar connected directly to corresponding ends of said springs and bodily movable with and by the spring ends relative to the body.

2. In a motor vehicle, the combination with the body and a pair of leaf springs extending longitudinally at opposite sides of the body, of means flexibly connecting the spring ends to the vehicle body, and a crossbar substantially inflexible in a vertical direction connected rigidly to corresponding ends of the springs at opposite sides of the body and bodily movable with and by the spring ends relative to the body.

3. In a motor vehicle, the combination with the body and leaf springs supporting the body, of shackles flexibly connecting ends of the springs with the body, and means connecting the spring ends independently of the shackles and bodily movable with and by the spring ends relative to the body for maintaining such spring ends and the body in substantially uniform angular relation transversely of the springs when the body rocks transversely of the springs.

4. In a motor vehicle, the combination with the body and a pair of substantially parallel leaf springs supporting the body, of shackles flexibly connecting ends of the springs to the body, and means connected to the spring ends independently of the shackles and bodily movable with and by the spring ends relative to the body to twist the springs ends and thereby relieve the shackles of edge loading.

5. In a motor vehicle, the combination with the body and a pair of substantially parallel leaf springs supporting the body at opposite sides thereof, of shackles flexibly connecting ends of the springs to the body, and means substantially inflexible in a vertical direction connected rigidly to corresponding ends of the springs and bodily movable with and by the spring ends relative to the body.

6. In a motor vehicle, the combination with the body and a pair of longitudinally extending springs at opposite sides of the body, of means flexibly connecting ends of the springs with the body, and a crossbar substantially inflexible in a vertical direction extending between corresponding ends of the springs and rigidly connected thereto independently of the means that flexibly connect the springs and the body and bodily movable with and by the spring ends relative to the body.

7. In a motor vehicle, the combination with the body and a pair of longitudinally extending springs at opposite sides of the body, of shackles flexibly connecting the springs with the body with provision for relative rocking and bodily movement, and a crossbar substantially inflexible in a vertical direction, but relatively flexible in a fore and aft direction rigidly connected to corresponding ends of the springs independently of the shackles and bodily movable with and by the spring ends relative to the body.

8. In a motor vehicle, the combination with the body and a pair of longitudinally extending springs at opposite sides of the body, of shackles comprising substantially flat fabric links disposed transversely of the body for flexibly connecting the springs with the body, and means connected to the spring ends and bodily movable with and by the spring ends relative to the body to maintain the body and the spring ends to which the fabric links are connected in substantially uniform angular relation transversely of the vehicle to relieve the fabric of edge loading.

9. In a motor vehicle, the combination with the body and a pair of longitudinally extending springs at opposite sides of the body, of shackles flexibly connecting the spring ends with the body comprising plates of flexible material secured to and disposed in compression between the spring ends and the body, and means connected to the springs independently of the shackles and bodily movable with and by the spring ends relative to the body for maintaining a substantially uniform angular relation of the spring ends and the body transversely of the vehicle.

10. In a motor vehicle, the combination with the body and a pair of longitudinally extending springs at opposite sides of the body, of transversely extending bearing members pivotally connecting the body with the spring ends, and means connected to the springs independently of said bearing members and bodily movable with and by the spring ends relative to the body for maintaining a substantially uniform angular relation of the spring ends and the body transversely of the vehicle.

11. In a motor vehicle, the combination with the body and a pair of longitudinally extending springs at opposite sides of the body, of shackle links connecting the spring ends with the body, means forming transverse pivotal connections between the shackle links and the body and between the shackle links and the springs, and means connected to the spring ends independently of the shackle links and bodily movable with and by the spring ends relative to the body for maintaining a substantially uniform angular relation of the spring ends and the body transversely of the vehicle.

12. In a motor vehicle, in combination, a pair of longitudinally extending parallel springs, a vehicle body slidingly supported on the springs at one end of the springs, and a transverse member and bodily movable with and by the spring ends relative to the body connecting the spring ends and constraining them to remain in parallelism with the body in a direction transversely of the body.

13. In a motor vehicle, in combination, a pair of parallel springs, a body supported thereby, including a pair of frame members, each of said frame members provided with a bearing surface resting on one of the springs, and with arms extending on opposite sides of the associated spring and spaced sufficiently to allow limited sidewise play of the spring, the inner surfaces of said arms merging with the bearing surface through rounded corners, and a cross member rigidly connected to corresponding ends of the springs and bodily movable with and by the spring ends relative to the body.

14. In a motor vehicle, in combination, a body including frame members at opposite sides thereof, link shackles pivotally connected to said frame members, brackets pivotally connected to said link shackles, springs rigidly secured to said brackets, and a cross member rigidly connected to corresponding spring ends at opposite sides of the body and bodily movable with and by the spring ends relative to the body.

15. In a motor vehicle, in combination, a body including frame members at opposite sides thereof, link shackles pivotally connected to the frame members, a cross bar pivotally connected to said shackles, and springs rigidly connected to said cross bar, said cross bar being bodily movable by and with the spring ends relative to the body.

16. In a motor vehicle, in combination, a body including frame members at opposite sides thereof, link shackles pivotally connected to the frame members a cross bar pivotally connected to said shackles, and springs rigidly connected to said cross bar, the cross bar serving as a body supporting connection between the springs and the body and being bodily movable with the spring ends relative to the body.

17. In a motor vehicle, in combination, a body including frame members at opposite sides thereof, link shackles pivotally connected to the frame members, a cross bar pivotally connected to said shackles, and springs rigidly connected to said cross bar, the springs being more widely spaced than the frame members and the frame members being flexibly connected to the cross bar between the points of connection of the cross bar to the springs, said cross bar being bodily movable by and with the spring ends relative to the body.

18. A vehicle suspension comprising a plurality of leaf springs, shackles for connecting the springs with the body of the vehicle, and means other than the shackles connected directly to the spring ends and bodily movable with and by the spring ends relative to the body for holding corresponding ends of the springs in the same plane and equi-distant from each other.

In testimony whereof I have affixed my signature to this specification.

HARVEY W. BELL.